United States Patent
Verma

(10) Patent No.: US 10,630,679 B2
(45) Date of Patent: Apr. 21, 2020

(54) METHODS PROVIDING AUTHENTICATION DURING A SESSION USING IMAGE DATA AND RELATED DEVICES AND COMPUTER PROGRAM PRODUCTS

(71) Applicant: CA, Inc., New York, NY (US)

(72) Inventor: Vineet Verma, Hyderabad (IN)

(73) Assignee: CA, Inc., New York, NY (US)

( * ) Notice: Subject to any disclaimer, the term of this patent is extended or adjusted under 35 U.S.C. 154(b) by 162 days.

(21) Appl. No.: 15/341,904

(22) Filed: Nov. 2, 2016

(65) Prior Publication Data

US 2018/0124046 A1    May 3, 2018

(51) Int. Cl.
| | |
|---|---|
| *G06F 21/00* | (2013.01) |
| *H04L 29/06* | (2006.01) |
| *G06K 9/00* | (2006.01) |
| *G06F 16/583* | (2019.01) |
| *G06F 16/2457* | (2019.01) |

(52) U.S. Cl.
CPC .... *H04L 63/0861* (2013.01); *G06F 16/24578* (2019.01); *G06F 16/5838* (2019.01); *G06K 9/00288* (2013.01)

(58) Field of Classification Search
CPC ............. H04L 63/0861; G06F 17/3053; G06F 17/30256; G06K 9/00288
See application file for complete search history.

(56) References Cited

U.S. PATENT DOCUMENTS

| | | | |
|---|---|---|---|
| 8,370,639 B2 | 2/2013 | Azar et al. | |
| 9,392,460 B1* | 7/2016 | Blake | ................... H04W 4/029 |
| 2002/0174344 A1* | 11/2002 | Ting | ........................ G06F 21/32 713/185 |
| 2006/0288234 A1* | 12/2006 | Azar | ....................... G06F 21/32 713/186 |
| 2009/0133051 A1* | 5/2009 | Hildreth | ............... H04N 5/4403 725/28 |
| 2013/0311768 A1* | 11/2013 | Fosmark | ............ G06Q 20/3223 713/155 |
| 2014/0366111 A1* | 12/2014 | Sheller | .................... H04L 63/08 726/7 |
| 2015/0106897 A1* | 4/2015 | Davis | .................... H04L 63/083 726/7 |
| 2016/0057139 A1* | 2/2016 | McDonough | ....... H04L 63/0861 726/6 |
| 2016/0241532 A1* | 8/2016 | Loughlin-Mchugh | ........................ H04L 63/0838 |
| 2018/0012003 A1* | 1/2018 | Asulin | .................. G06F 21/316 |
| 2018/0049028 A1* | 2/2018 | Tali | ....................... H04W 4/029 |
| 2018/0063125 A1* | 3/2018 | Bryant | ............... H04L 63/0838 |
| 2018/0068103 A1* | 3/2018 | Pitkanen | ............. H04L 63/0861 |

* cited by examiner

*Primary Examiner* — Don G Zhao
(74) *Attorney, Agent, or Firm* — Meyertons, Hood, Kivlin, Kowert & Goetzel, P.C.

(57) ABSTRACT

A method providing use of an application may include providing a session for a user of the application, wherein the session is provided based on a credential for the user. While providing the session, image data for the session may be obtained, and responsive to the image data for the session, authentication may be performed based on a determination whether the image data for the session includes a facial image that matches the user credential. Responsive to success of the authentication based on the image data for the session, the session for the user of the application may continue to be provided. Related devices and computer program products are also discussed.

22 Claims, 9 Drawing Sheets

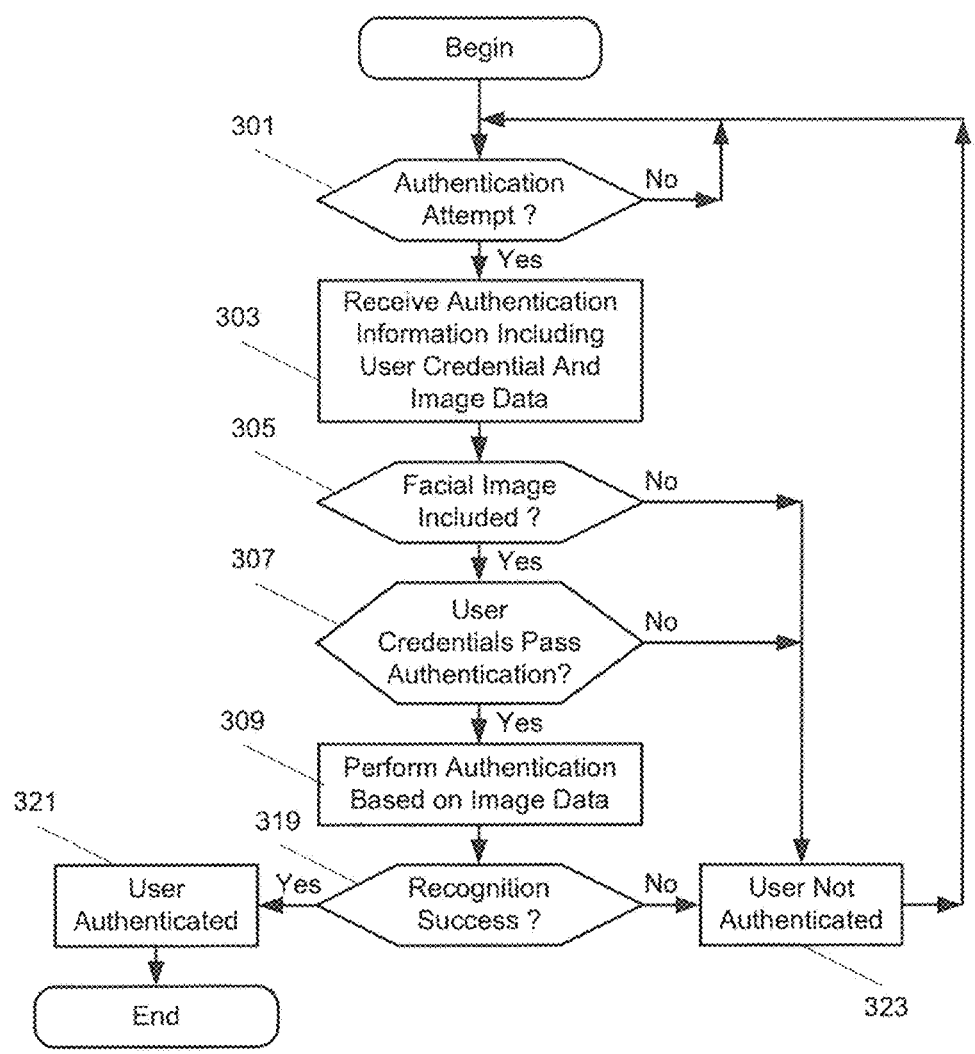

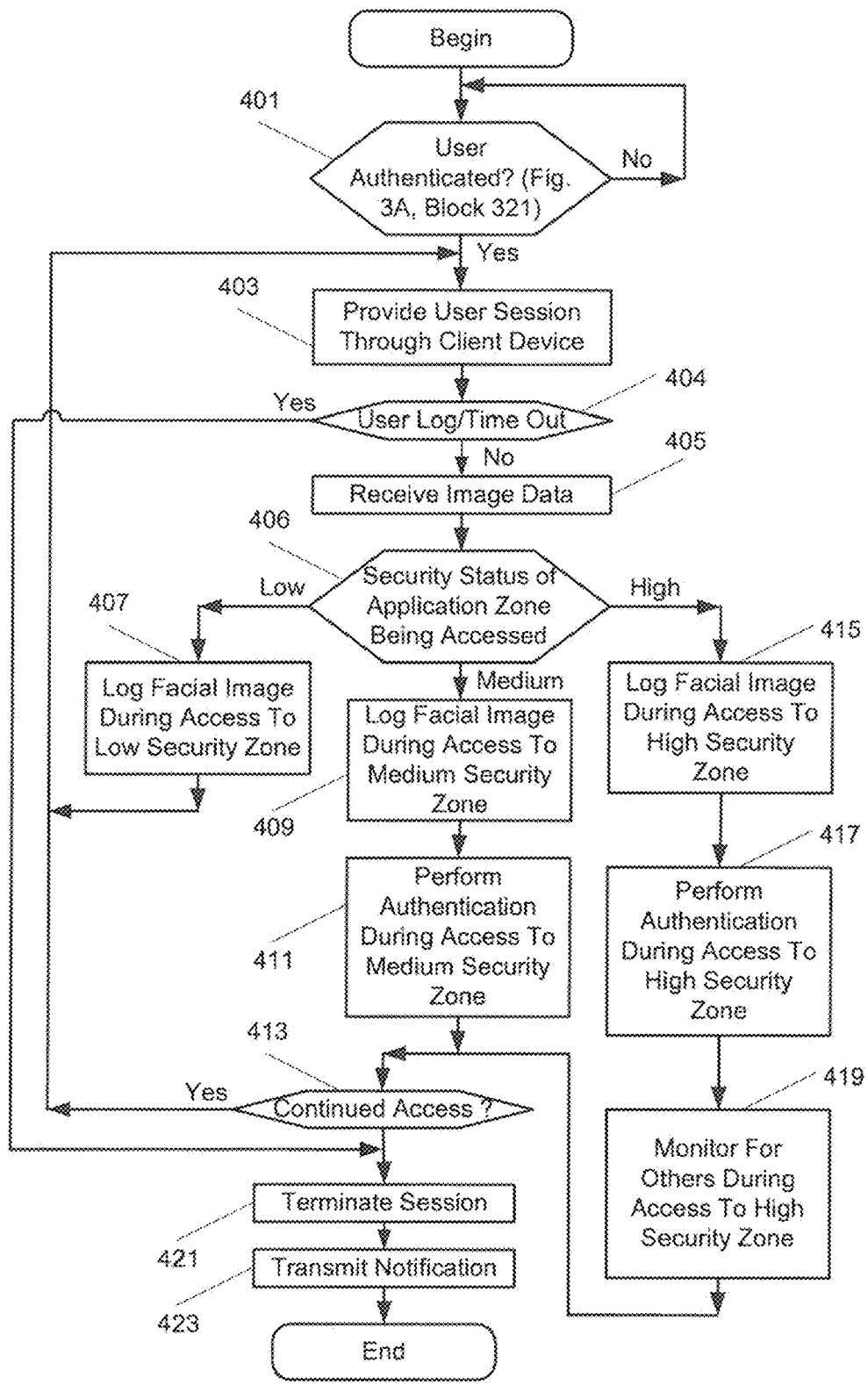

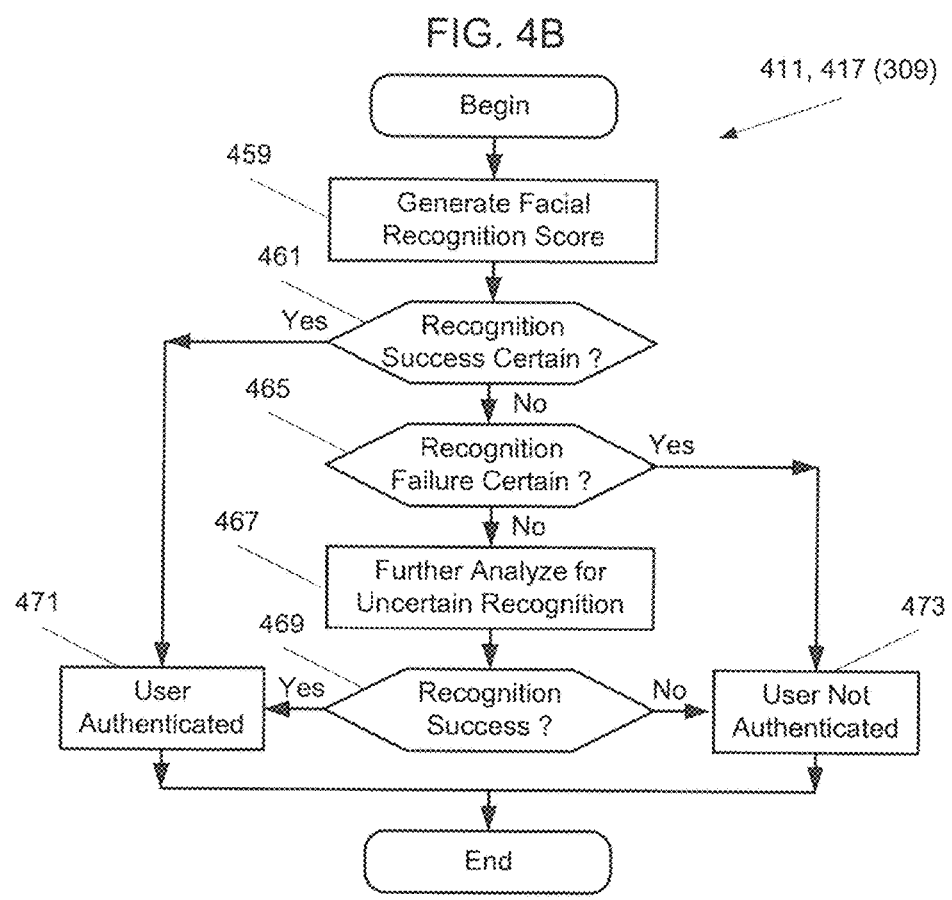

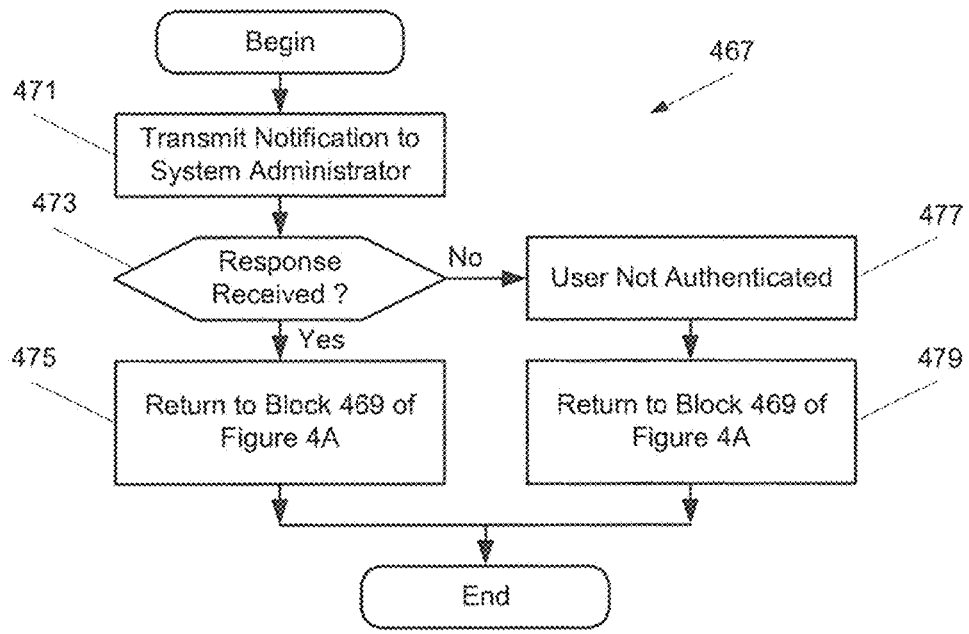
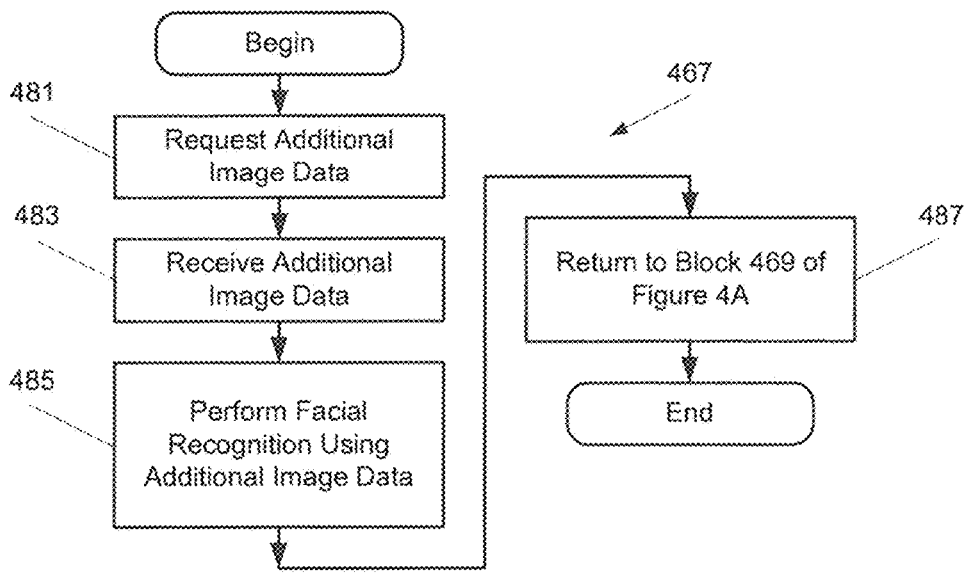

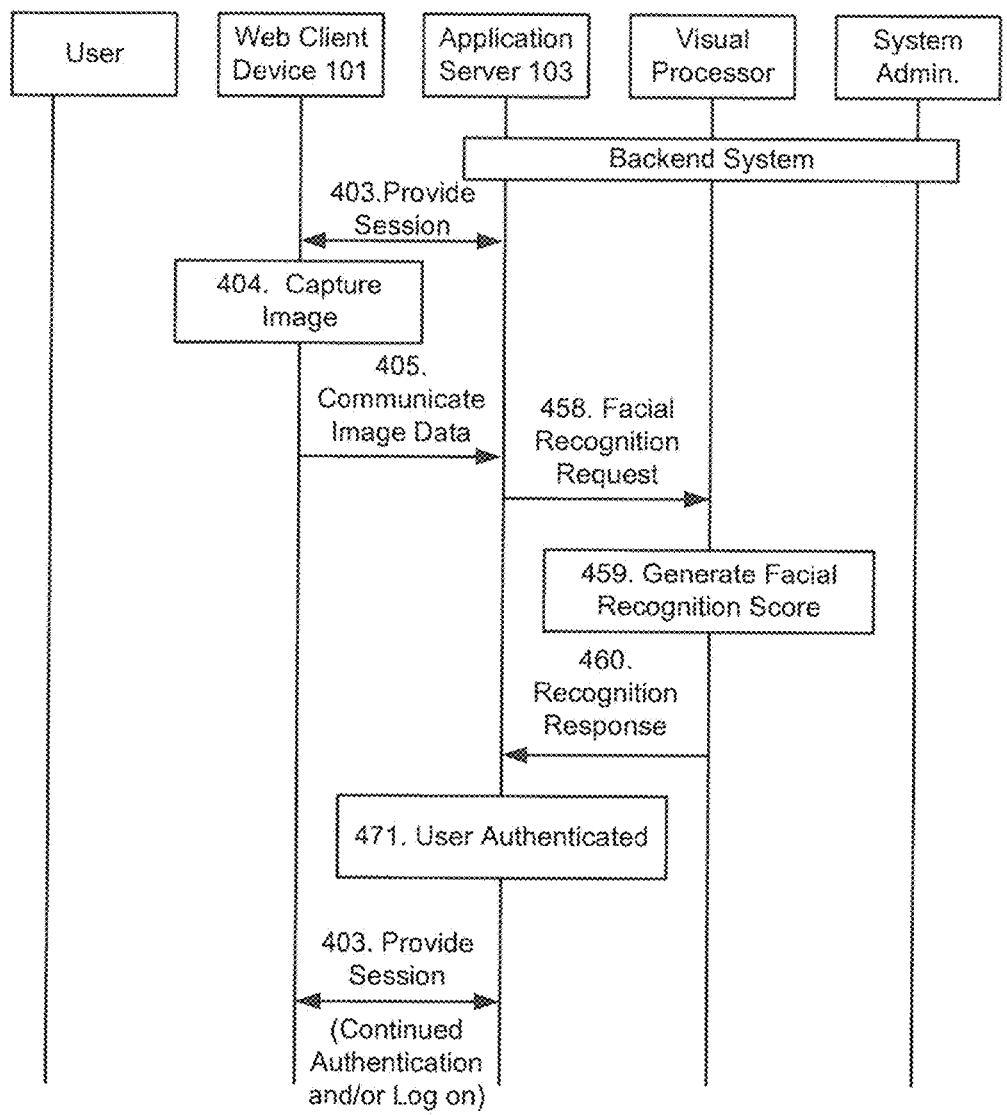

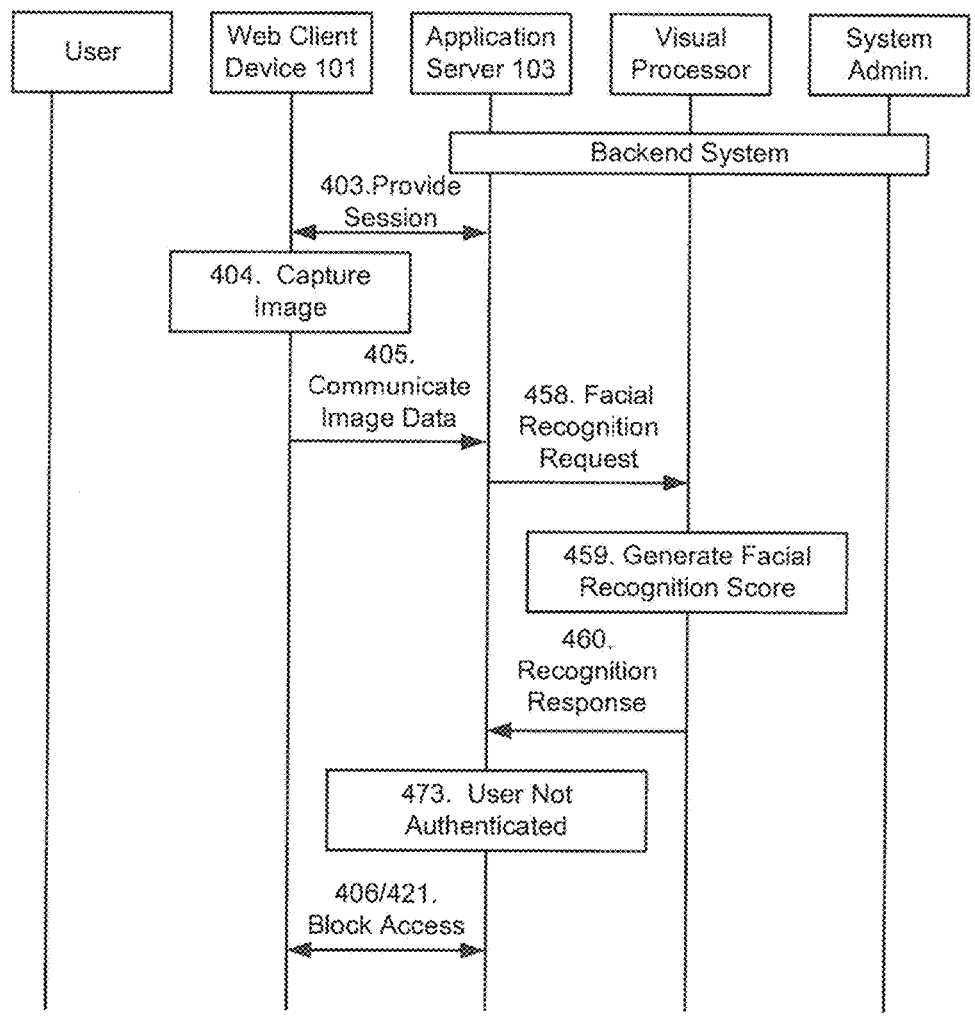

METHODS PROVIDING AUTHENTICATION DURING A SESSION USING IMAGE DATA AND RELATED DEVICES AND COMPUTER PROGRAM PRODUCTS

BACKGROUND

The present disclosure relates to authentication, and more particularly, to visual authentication and related methods, devices, and computer program products.

Visual Authentication is a technique to reduce the possibility that an unauthorized user gains access to a secure system. Visual authentication and/or other techniques (e.g., usernames and passwords) attempt to provide that only the authorized user authenticating into the system is actually using the authenticated system, rather than someone who has acquired the user's credentials (e.g., a user identification and a password) by invalid or even valid means.

A facial biometric recognition system is discussed, for example, in U.S. Pat. No. 8,370,639 to Azar et al., entitled "System and Method for Providing Secure Access to an Electronic Device Using Continuous Facial Biometrics." In the Azar patent, a digital camera provides facial biometric images from a user of the electronic device, a processor compares the facial biometric images to biometric image data stored in a database, and operational access is granted based on the comparing.

SUMMARY

A method providing use of an application may include providing a session for a user of the application, wherein the session is provided based on a credential for the user. While providing the session, image data for the session may be obtained, and responsive to the image data for the session, authentication may be performed based on a determination whether the image data for the session includes a facial image that matches the user credential. Responsive to success of the authentication based on the image data for the session, the session for the user of the application may continue to be provided. Related devices and computer program products are also discussed.

A first network device may include a network interface configured to communicate with a second network device through a network, a processor coupled to the network interface, and a memory coupled to the processor and storing computer readable program code. The computer readable program code is executable by the processor to perform: providing a session for a user of a second network device using the network application over a network using the network application, wherein the session is provided based on a credential for the user of the second network device; receiving image data for the session from the second network device over the network while providing the session; performing authentication responsive to the image data for the session based on a determination whether the image data for the session includes a facial image that matches the user credential; and continuing to provide the session for the user of the second network device using the network application responsive to authentication success based on the image data for the session.

A computer program product may include a non-transitory computer readable storage medium comprising computer readable program code embodied in the medium. The computer readable program code may be executed by a processor of a first network device to cause the processor to perform operations comprising: providing a session for a user of the application, wherein the session is provided based on a credential for the user; while providing the session, obtaining image data for the session; responsive to the image data for the session, performing authentication based on a determination whether the image data for the session includes a facial image that matches the user credential; and responsive to success of the authentication based on the image data for the session, continuing to provide the session for the user of the application.

Other methods, network devices, and computer program products according to embodiments of inventive subject matter will be or become apparent to one with skill in the art upon review of the following drawings and detailed description. It is intended that all such additional methods, network devices, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 3, 4A, 4B, 4C, and 4D are flow charts illustrating operations of an application server according to some embodiments of the present disclosure;

FIGS. 6A and 6B are message diagrams illustrating operations according to some embodiments of inventive concepts.

DETAILED DESCRIPTION

In the following detailed description, numerous specific details are set forth in order to provide a thorough understanding of embodiments of the present disclosure. However, it will be understood by those skilled in the art that embodiments of present inventive concepts may be practiced without these specific details. In other instances, well-known methods, procedures, components and circuits have not been described in detail so as not to obscure present inventive concepts. It is intended that all embodiments disclosed herein can be implemented separately or combined in any way and/or combination.

Various embodiments of the present disclosure are directed to improving communication security between network devices. The communication security operations can be provided using low-computationally intensive software and without additional hardware in the transmitting and receiving network devices. Moreover, the communication security operations may be performed with minimal additional network communication overhead.

Figure 1:
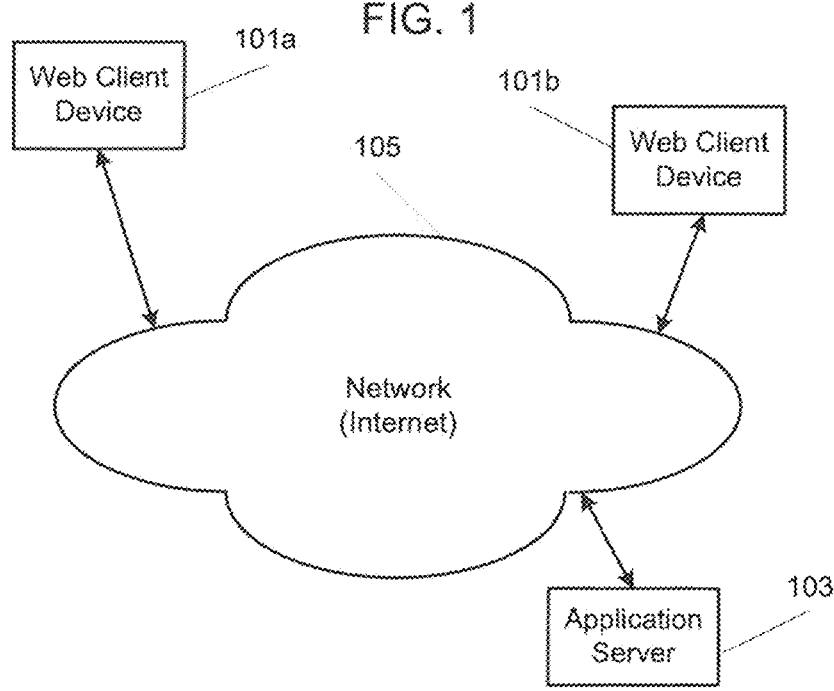
FIG. 1 is a web client and server devices in a network environment according to some embodiments of the present disclosure.

FIG. 1 is a diagram illustrating web client devices 101a and 101b that communicate with an application server 103 through a data network according to some embodiments of the present disclosure. As discussed in greater detail below, a session may be established between a web client device (e.g., web client device 101a) and application server 103 through data network 105 to provide use of a web application (also referred to as a network application) hosted at application server 103.

Figure 2A:
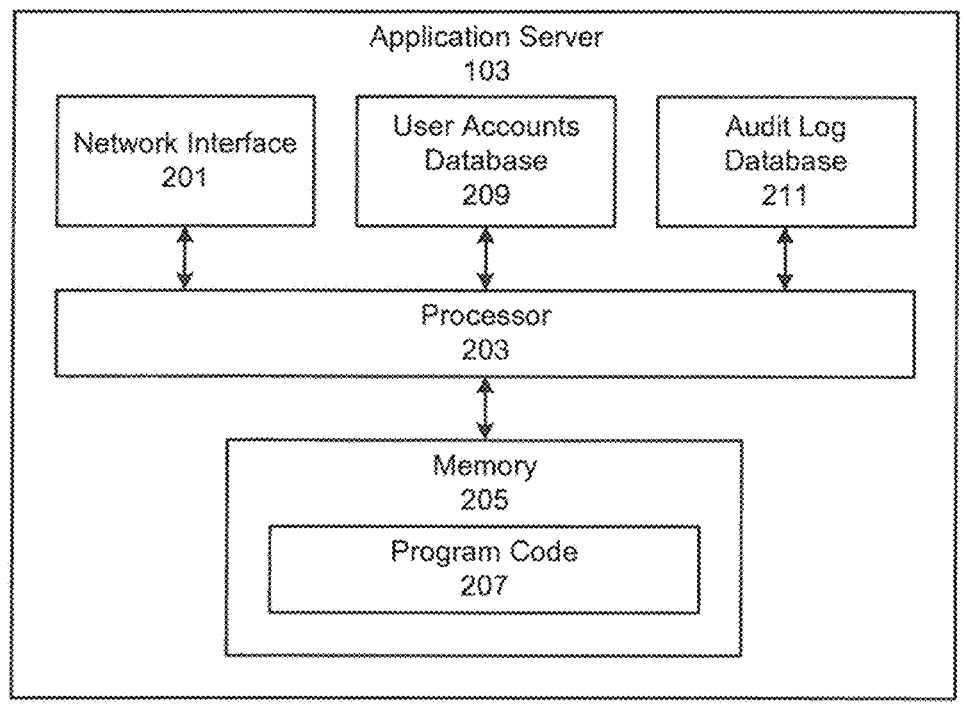
FIGS. 2A and 2B are block diagrams illustrating elements of an application server and a web client device according to some embodiments of the present disclosure.

FIG. 2A is a block diagram of an example of application server 103. Application server 103 may include processor 203, memory 205, network interface 201, user accounts database 209, and audit log database 211. While not shown, application server 103 may also include a user interface (e.g., including a keyboard, display, touch sensitive display, etc.) coupled with processor 203. While user account database 209 and audit log database 211 are shown as elements of application server by way of example, such databases or other sources of user account and/or audit log information may be provided external to and/or remote from application server 103 (e.g., coupled through network 105 and network interface 201.

Network interface 201 may include a wired network interface (e.g., Ethernet interface) and/or a radio access network transceiver that communicates through network 105 with one or more web client devices 101a/101b. Processor 203 may include one or more data processing circuits, such as a general purpose and/or special purpose processor (e.g., microprocessor and/or digital signal processor) that may be collocated or distributed across one or more networks. Processor 203 may be configured to execute computer program code 207 in memory 205, described below as a non-transitory computer readable medium, to perform at least some of the operations described herein as being performed by application server 103. The illustrated computer program code 207 may include program code that is processed by processor 203 to provide application server operations including authentication which may operate according to one or more of embodiments disclosed herein.

Figure 2B:
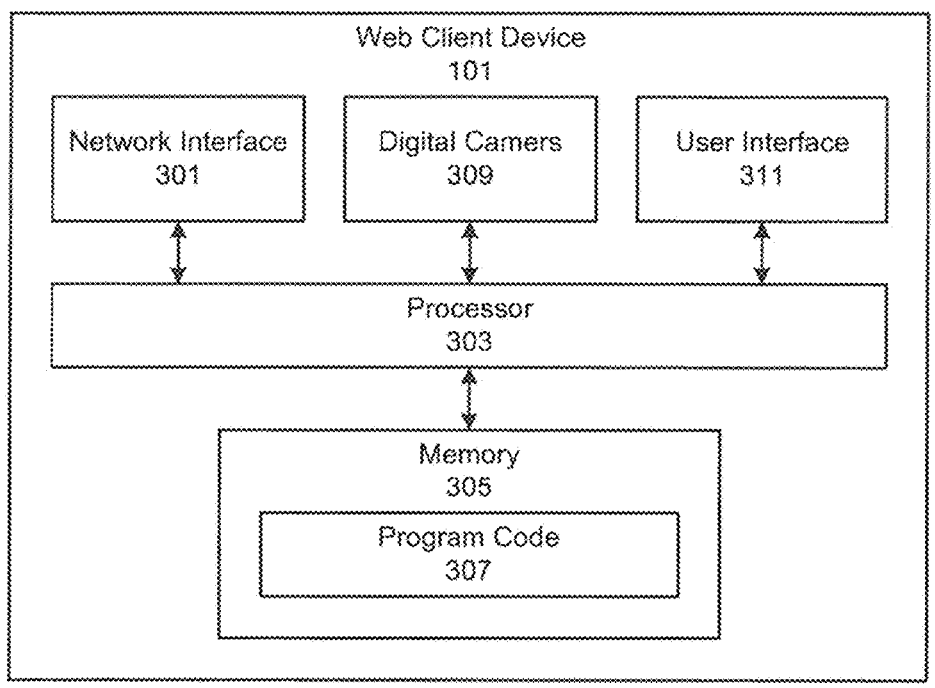

FIG. 2B is a block diagram of an example of a web client device 101. Web client device 101 may include processor 303, memory 305, network interface 301, digital camera 309, and user interface 311 (e.g., including a keyboard, display, touch sensitive display, etc.). Network interface 301 may include a wired network interface (e.g., Ethernet interface) and/or a radio access network transceiver that communicates through network 105 with application server 103. Processor 303 may include one or more data processing circuits, such as a general purpose and/or special purpose processor (e.g., microprocessor and/or digital signal processor) that may be collocated or distributed across one or more networks. Processor 303 may be configured to execute computer program code 307 in memory 305, described below as a non-transitory computer readable medium, to perform at least some of the operations described herein as being performed by a web client device 101. The illustrated computer program code 307 may include program code that is processed by processor 303 to provide web client device operations including authentication which may operate according to one or more of embodiments disclosed herein.

Visual Authentication may address two issues when using a web based application hosted at application server 103 over network 105. One issue is that an unauthorized person may gain access by logging on using the credentials of an authorized user. Another issue is that an unauthorized user may gain access (without logging on) to an open session on a terminal (e.g., web client device 101a, also referred to as a console, monitor, etc.) that has been left unattended.

Some Web application systems may allow any person to access a web application from a client device if the person has a valid User ID and password. In some cases, RSA Tokens may be provided to the authorized user and/or OTP (One Time Password) systems may be applied to reduce a risk of an unauthorized user gaining access the system (e.g., using a valid User ID and password of someone else). Such techniques, however, may not adequately protect against an unauthorized person accessing the web application using credentials of someone else.

Moreover, unauthorized access may be obtained if an authorized/authenticated user leaves the terminal unattended during an open session for a period of time that is still under session time out. In such a scenario, an unauthorized user (also referred to as a culprit) may access the system and may execute actions under the garb of the authenticated user. A system audit would indicate that the unaware authenticated user performed the system authentication because the session was initiated using credentials for the authenticated user.

Current systems may not adequately address the issue of unauthorized access during an open session when the terminal is left unattended. Moreover, the first issue may not be adequately handled because the multilevel authentications may be expected to address this issue.

According to some embodiments of the present disclosure, a prerecorded data set of all users in the system may be maintained in user accounts database 209. The data set may contain facial image data for all users who have authentications for the target system, e.g., for the web application hosted by application server 103.

As discussed herein, an authenticated user is an intended user of the web application, and a culprit is a non-intended user of the web application who may have acquired access credentials by illegal and/or inappropriate means. A System Administrator (also referred to as a superadmin(s)) is an administrator of the system who has control (e.g., full control) over system operations.

According to one scenario, a culprit may improperly/illegally acquire access credentials (e.g., user identification and password) of an authenticated user. While Authenticating using the improperly/illegally acquired User ID and Password, in addition to multilevel authentication, the web application at application server 103 would have access to digital camera 309 (also referred to as a webcam) web client device 101, which will capture an image of the person's face who is accessing the system. If no facial image is detected in image data provided by digital camera 309 or no webcam is detected, the authentication system of the web application would fail and login would not be allowed.

The captured image of the person trying to access the web application would then be received at processor 203 (through network interface 201) of application server 103 to analyze against the prerecorded data set of user accounts database 209. Facial recognition algorithms would then be used by processor 203 to determine whether the image from the login client device is actually an image of the authenticated user (associated with the user identification and password), or not. If the User ID, password, and facial image are valid for the authenticating user, then the web application allows the user to log in and work (using the web application) as normal.

If there is a certain determination that the user is not the authenticating user (i.e., the facial image does not match a facial image from the data set associated with the user ID), then the system would lock out the user and/or client device 101a and notify the System Administrator and/or the Authenticating User (associated with the user ID). If it is uncertain whether the user may or may not be the authenticating user based on the facial image, then the System Administrator may be notified and asked to check to confirm whether the user is same as the one authenticating (i.e., that the facial image matches a facial image from the data set associated with the user ID) or is an imposter. The system administrator can thus allow or deny system access after making a human comparison between the facial image provided during the authentication process and the facial image from the data set of user accounts data base 209.

In some situations, a culprit may be present around the web client device when it is left unattended after authentication while a client-server session with application server 103 is open for the secure web application.

In this situation, the Authenticated user is properly logged using proper credentials (user identification and user password) in to the system. If the authenticated user leaves the web client device unattended while the session is open, the culprit may then get free access to the system. Here, the system may apply a mini-interval time, so that the web client device keeps sampling the user facial image and keeps analyzing if the user accessing the web application is still the same as the one who authenticated or whether the user has changed. Stated in other words, processor 203 may periodically (according to the mini-interval) instruct web client device to provide image data from digital camera 309 over network 105 through network interface 301 to processor 303.

In the event that the current session user seems to be different than the user who initiated the session, then processor 203 may execute one or more of the following operations. Processor 203 may inform (intimate) the System Administrator of the unauthorized access (e.g., via e-mail, text message, or other notification). Processor 203 may inform (intimate) and/or request confirmation from the Authenticated User associated with the user ID via Mobile Client (e.g., via text and/or telephone message). Processor 203 may lock down Red Zone Areas (also referred to as high security areas) in the application which may be more sensitive than other section of the application. Processor 203 may keep sampling the user image on set intervals, and maintains the sampled images in audit logs. This may allow proper logging of all user activity. Processor 203 may use the sampled image data from logs to better build and/or improve training data related to the authenticated users, thus reinforcing the Identification process. Stated in other words, processor 203 may use the sampled image data to update the facial image data of a user to user account database 209 (e.g., considering changes in hair style, hair color, facial hair, eyewear, weight, age, etc.) to improve facial recognition.

According to some embodiments of the present disclosure, continuous authentication may be used by application server 103 to validate a user based on the following rules. In a green zone (low security) area, no continuous authentication may be required, but snapshots may be received from client device 101*a* continuously to log use (in audit log database 211) and to rebuild/update the facial data. In a yellow zone (medium security) area, continuous authentication may be required, but only to make sure that the authenticating user is present in the environment and is visible (e.g., to indicate that the user is present when certain actions take place). In a red zone (high security) area, continuous authentication may be required and only the Authenticating User should be present in the vicinity/visibility. This is to provide that the user does not share secure and sensitive data with some other person. This is to reduce the risk of collusion between an unauthorized user and the authorized user (who may be under duress).

To provide reinforced security for Red Zone areas, processor 203 may randomly generate a request for one of the following to determine if a fake face is being presented. As a first example, processor 203 may transmit a request (through network interface 201 and network 105) to web client device 101*a*, instructing web client device 101*a* to provide a notification to the user to hold a picture identification ID cars alongside his face so that two different images (of different sizes) of the same face should be present in image data from web client device 101*a*. Successful recognition of the face of the authenticated user twice in the same image data should reduce a likelihood of a culprit tricking the system. As a second example, processor 203 may transmit a request (through network interface 201 and network 105) to web client device 101*a*, instructing web client device 101*a* to provide a notification to the user to point a direction of his face to a certain point on the screen (e.g., by providing an icon on the screed on web client device 101*a* for the user to look at) Comparisons to the pre-recorded dataset (of user accounts database 209) based on Directional data provide higher accuracy in comparison to similar directional faces than the ones generically captured without regard to an orientation of the user's face. Accordingly, phony images and/or videos may fail such authentication.

According to some embodiments disclosed herein, facial images (also referred to as snapshots) may be logged in audit log database 211 during a session (e.g., periodically) to maintain a log for the web application of all the users/persons that were present while actions were being performed and/or access was being granted.

According to some embodiments, false positive and/or false negative facial recognition results may be reduced, for example, using: third party involvement; multi-factor authentication; and/or user notification. With third party involvement, for example, processor 203 may notify a System Administrator (e.g., via e-mail, text message, etc.) if automated facial recognition is uncertain, and the system administrator may be asked to make a determination if the result of automated facial recognition is uncertain. Further access through the session may be blocked by processor 203 unless/until the system administrator replies with verification that the user is approved. With multi-factor authentications, for example, the web application may request additional images with instruction for the user to look in a particular direction(s), and the additional images may be used to make an automated determination if the initial automated facial recognition is uncertain. With user notification (also referred to as user information/intimation), processor 203 may notify the User associated with the user ID by other means (not via client device 101*a*) such as by telephone call or SMS (short message service) text message to a different device (e.g., a cell phone), and the user may authorize the authentication using a reply communication (e.g., text message).

According to some embodiments of the present disclosure, processor 203 may selectively block user access (e.g., via lockdown or log off) with respect to sensitive zones or risky transactions (but not in all cases as that may not be needed). In response to a failure of facial recognition during a session, for example, processor 203 may block access with respect to medium (yellow zone) and/or high (red zone) security areas of the web application, while allowing continued access to low (green zone) security areas of the web application. According to some embodiments, processor 203 may perform facial recognition while accessing medium (yellow zone) and/or high (red zone) security areas of the web application, but processor 203 may omit facial recognition while accessing low (green zone) security areas. When using a low security zone of a web application, processor 203 may thus allow an unauthorized user to work on the behalf of an authorized user without triggering a lockout.

Operations of application server 103 and processor 203 will now be discussed with respect to the flow charts of FIGS. 3, 4A, 4B, 4B, and 4D. Operations of FIG. 3 relate to initial user authentication when initiating a session between web client device 101*a* and application server 103. At block 301, processor 203 may determine if an initial authentication is being attempted. Responsive to such an attempt from web client device 101*a* at block 301 (i.e., before providing a session with web client device 101*a*), processor 203 may receive authentication information from web client device 101*a* (through network 105 and network interface 201) at block 303. More particularly, the authentication information may include a user credential (e.g., user identification and password) and pre-session image data (i.e., an image or snapshot captured through digital camera 309).

If the pre-session image data does not include a facial image, if no pre-session image data is received, or if no digital camera is present at web client device 101 at block 305, processor 203 may block authentication at block 323 so that no session is established with web client device 101*a*. If pre-session image data is provided and the pre-session image data includes a facial image at block 305, processor 203 determines at block 307 if the user credentials pass authentication. If the user credentials do not pass authentication (e.g., the user identification is not valid, or the password does not match the user identification) at block 307, processor 203 may block authentication at block 323 so that no session is established with web client device 101*a*.

If the user credentials pass authentication (e.g., the user identification is valid, and the password matches the user identification at block 307, then processor 203 performs authentication at block 309 based on a determination whether the pre-session image data includes a facial image that matches the user credential(s). If facial recognition is successful at block 319, processor 203 may authenticate the user at block 321 and provide a session over network 105 with web client device 101*a* using the web application. Processor 203 may thus provide the session responsive to authentication success using automated facial recognition based on the pre-session image data.

Operations of FIG. 4A relate to continuous authentication when using the session established between web client device 101*a* and application server 103 (using operations of FIG. 3). Responsive to user authentication (discussed above with respect to FIG. 3) at block 401, processor 203 may provide the session for the authenticated user of the web application at block 403, wherein the session is provided based on the user credential and pre-session image data (as discussed above with respect to FIG. 3). Processor may continue providing the session for web client device 101*a* at block 404 as long as the user does not log out of (or otherwise close) the session and as long at the session does not time out due to inactivity.

While providing the session, processor may receive image data (captured by digital camera 309) for the session from web client device 101*a* at block 405. The image data (also referred to as session image data) may be automatically provided by web client device 101*a* (e.g., periodically and/or responsive to certain activities), or the image data may be provided by web client device 101*a* responsive to requests transmitted from processor 203. In any event, the image data may be received at block 405 repeatedly and/or continuously at block 405 to provide a check that the authenticated user for the session continues to be present during the session.

As shown in FIG. 4A, processor 203 may determine at block 406 whether the session is currently being used to access a low security zone of the web application, a medium security application zone of the web application, or a high security application zone of the web application. In any of the three types of security zones, processor 203 may log the facial image of the user in audit log database 211 as shown at blocks 407, 409, and 415. The resulting audit log may be used later to identify a user who performed a particular operation/activity during a session. For low security zones, however, continuous authentication based on facial recognition may be omitted.

For medium and high security zones, processor 203 may perform continuous authentication based on a determination whether the current image data for the session from block 405 includes a facial image that matches the user credential for the session as shown at blocks 409 and 415. Responsive to success of the authentication based on the image data for the session at bloc 411 and/or 417, processor 203 may continue to provide the session for the user of the application at blocks 413 and 403, and operations of blocks 404, 405, 406, 407, 409, 411, 415, 417, 419, and/or 413 may be repeated. Responsive to failure of the authentication based on the image data for the session at bloc 411 and/or 417, processor 203 may block access to at least a portion of the network application at blocks 413 and/or 421. Blocking access, for example, may include terminating the session at block 421 (also referred to as logging the user out), or blocking access to a higher security zone (e.g., medium and high security zones) while continuing to allow access to a lower security zone (e.g., a low security zone) at blocks 413 and 406.

Performing continuous authentication based on the determination whether the image data includes a facial image that matches the user credential at block 411 and/or 417 may thus include initiating facial recognition to compare the image data for the session with a data set of user accounts database 209 including facial image data of a plurality of users of the application including the user. Responsive to the image data for the session including a facial image that matches the user credential at block 411 and/or 417, processor may also update the facial image data of the user in the data set of user accounts database 209 using the image data for the session. The updating may thus support improved facial recognition to account for different views of the users face (as the user looks in different directions) and/or to account for changes in hair style, hair color, facial hair, eyewear, weight, age, etc.). Stated in other words, the image data for the session may be used to update the facial image data of the user in the data set of user accounts database 209, and the updated facial image data of the user in the data set of the user accounts database 209 may be used to perform future authentications at block 309, 411, and/or 417.

For high security zones, processor 203 may also monitor for the presence of others (in addition to the authenticated user) at block 419. Responsive to a determination that multiple facial images are included in the current image data of block 405, processor 203 may block access to at least a portion of the network application at blocks 413 and/or 421. Blocking access, for example, may include terminating the session at block 421 (also referred to as logging the user out), or blocking access to a higher security zone (e.g., medium and high security zones) while continuing to allow access to a lower security zone (e.g., a low security zone) at blocks 413 and 406. Continued access to a high security zone of the web application may be blocked responsive to both/either failure to identify the authenticated user in the current image data of the session and/or determination that another face (in addition to the face of the authenticated user) is present in the current image data.

Accordingly, pre-session image data may be used to provide visual authentication when the session is established as discussed above with respect to FIG. 3. First image data for the session (received from web client device 101a while providing the session) may be used to verify that the authenticated user is still at the client device as discussed above with respect to FIG. 4A. Moreover, image data for the session may be continuously received during the session to provide continuous verification. For example, image data may be received periodically (e.g., once per minute, once per 5 minutes, etc.) to provide the continuous verification. A duration of the period may be set to reduce network traffic and processing overhead while providing sufficient frequency that an unauthorized user is unlikely to gain access without detection.

As discussed above with respect to FIG. 4A, first image data at block 405 may include a facial image matching the authenticated user leading to a second process of authentication. After receiving the first image data for the session and after continuing to provide the session at block 413, processor 203 may receive second image data for the session at block 405 while providing the session. In either a medium or high security zone at block 406, processor 203 may perform authentication at block 411 or 417 based on a determination whether the second image data includes a facial image that matches the user credential. Responsive to failure of the authentication based on the second image data for the session at block 413, processor 203 may block access to at least a portion of the application. For example, processor 203 may block access by selectively blocking access to medium and high security zones at block 406 (while allowing access to a low security zone), and/or by terminating the session for the user at block 421. In addition, processor may transmit a notification of the failure to a system administrator and/or to the user associated with the credential at block 423 responsive to the failure of the authentication.

According to some embodiments, authentication of blocks 411 and/or 417 may be performed as illustrated in FIG. 4B. For example, processor 203 may generate a facial recognition score at block 459 based on a comparison of the image data for the session and the data set of user accounts database 209 including facial image data of a plurality of users of the network application including the user. A recognition score above a first threshold may indicate certain recognition success, a recognition score below a second threshold may indicate certain recognition failure, and a recognition score between the first and second thresholds may indicate uncertainty regarding recognition success or failure. Responsive to a recognition score above the first threshold at block 461, processor 203 may provide continued authentication of the user at block 471 (so that continued access is allowed at block 413 of FIG. 4A), and responsive to a recognition score below the second threshold at block 465, processor 203 may determine that the user is not authenticated at block 473 (so that continued access is no longer allowed at blocks 413, 421, and/or 406).

FIG. 6A is a message flow diagram illustrating certain authentication of FIGS. 4A and 4B according to some embodiments of inventive concepts. Application server 103 may provide the user session through client device 101 as discussed above with respect to block 403. At block 404, client device 101 may capture an image, and image data for the image may be transmitted from client device 101 and received by application server 103 as discussed above with respect to block 405. Application server 103 may generate a facial recognition request (including the image data) that is provided to a visual processor at operation 458, visual processor may generate the facial recognition score at block 459, and a recognition response (including the recognition score) may be provided to application server 103 at operation 460. Responsive to the recognition score indicting success (e.g., a recognition score above the threshold), application server 130 may confirm continued user authentication as discussed above with respect to operations 461 and 471, and application server 103 may continue providing the session as discussed above with respect to block 403. Operations of the visual processor may be performed, for example, by processor 203 of application server according to some embodiments, or a separate visual processor may be provided.

FIG. 6B is a message flow diagram illustrating certain failure of authentication of FIGS. 4A and 4B according to some embodiments of inventive concepts. Application server 103 may provide the user session through client device 101 as discussed above with respect to block 403. At block 404, client device 101 may capture an image, and image data for the image may be transmitted from client device 101 and received by application server 103 as discussed above with respect to block 405. Application server 103 may generate a facial recognition request (including the image data) that is provided to a visual processor at operation 458, visual processor may generate the facial recognition score at block 459, and a recognition response (including the recognition score) may be provided to application server 103 at operation 460. Responsive to the recognition score indicting failure (e.g., a recognition score below the threshold), application server 130 may determine that the user is not authenticated as discussed above with respect to blocks 465 and 473, and application server 103 may block access to at least a portion of application as discussed above with respect to operations 406 and/or 421.

Responsive to the recognition score falling between the first and second thresholds at blocks 461 and 465, processor 203 may determine that recognition is neither a certain success or failure, i.e., recognition is uncertain. In such a case, processor 203 may proceed with further analysis to determine whether continued authentication should be provided at block 467. Alternative embodiments of block 467 are discussed with respect to FIGS. 4C and 4D.

In FIG. 4C, for example, processor 203 may transmit a notification to a system administrator at block 471 responsive to uncertainty regarding the image data including the facial image that matches the user credential (e.g., based on the recognition score). If a response is received from the system administrator at block 473, processor 203 may determine success of facial recognition at block 469 based on the response from the system administrator. If the response from the system administrator confirms facial recognition, processor 203 determines that authentication is appropriate at block 471, or if the response from the system administrator denies facial recognition, processor 203 determines that authentication is not appropriate at block 473. If no response is received from the system administrator at block 473, processor 203 determines that authentication is not appropriate at block 477. In the event that the result of automated facial recognition is uncertain, processor 203 may continue providing the session responsive to receiving a confirmation from the system administer that the image data includes the facial image that matches the user credential.

In FIG. 4D, processor 203 may transmit a request for additional image data from web client device 101a at block 481 responsive to uncertainty regarding the image data including the facial image that matches the user credential. In response to the request, client device 101a may respond with additional image data (i.e., a second photograph) that is received by processor 203 through network interface 201 at block 483. At block 485, processor 203 may perform facial recognition using the additional image data, and the result of facial recognition using the additional image data may be used at block 469 to determine whether user authentication should be provided or not. Processor 203 may thus continuing to provide the session (or not) responsive to obtaining the additional image data including and performing facial recognition using any facial image included therein.

Figure 5A:
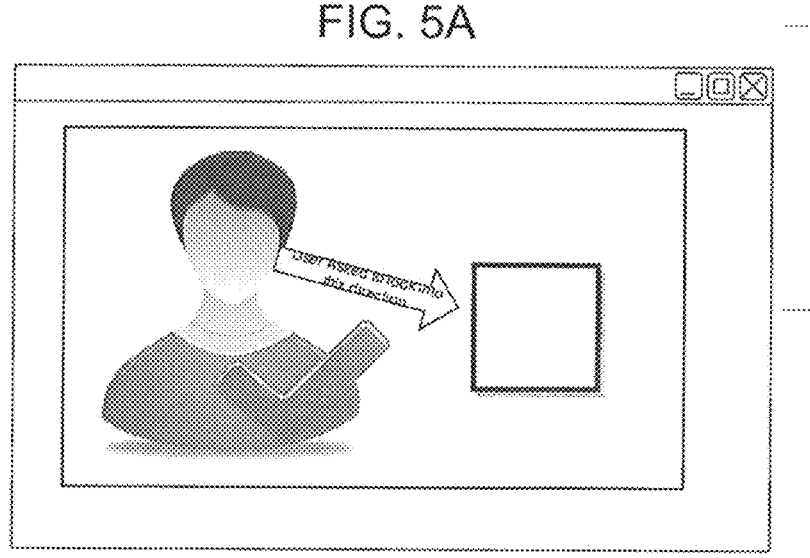
FIGS. 5A and 5B illustrate examples of further user images that may be used according to some embodiments of the present disclosure.

At block 481, for example, processor 203 may provide an instruction to the client device that the user is to look in a designated direction when the additional image data is captured by digital camera 309. For example, the user may be asked to look at an icon (e.g., a square) provided at a particular location on a screen of the client device at shown in FIG. 5A. The instruction may thus orient a face of the user in a direction that is more beneficial for facial recognition, so that facial recognition is more easily performed using the additional image data of block 483. Moreover, a photograph of the authenticated user may fail authentication because a different orientation of a three dimensional face is not available.

Figure 5B:
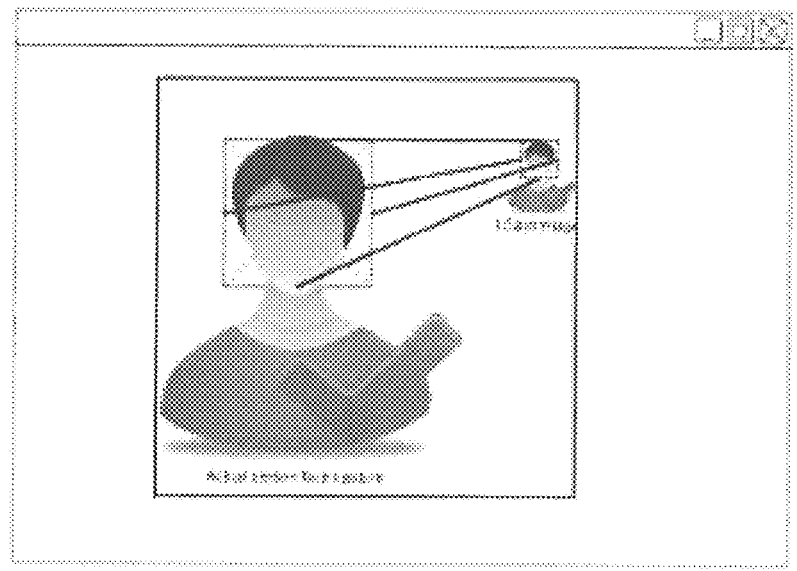

At block 481, processor 203 may provide an instruction to the client device that the user is to hold a photo-identification next to the user's head as shown in FIG. 5B. The additional image data of block 483 may thus include both the face of the user and the photo-identification including a photo of the user.

Moreover, operations of FIGS. 4B, 4C, 4D, 5A, and 5B may be performed with respect to authentication of block 309 of FIG. 3.

As discussed above according to some embodiments of inventive concepts, operations of FIGS. 3, 4A, 4B, 4C, and 4D may be performed by an application server providing a session for a user at a web client device, with the session being provided between the supplication server and the web client device over a network. According to some other embodiments, operations of FIGS. 3, 4A, 4B, 4C, and 4D may be performed at a device accessed directly by a user. For example, an application may be hosted on device 101 of FIG. 2B for direct use (without coupling over a network), and operations of FIGS. 3, 4A, 4B, 4C, and 4D may be performed at processor 303.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms first, second, etc. may be used herein to describe various messages, operations, and/or components, these messages, operations, and/or components should not be limited by these terms. These terms are only used to distinguish one message, operation, and/or component from another message, operation, and/or component. Thus, a first message, operation, and/or component discussed herein could be termed a second message, operation, and/or component without departing from the teachings of the present disclosure.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method providing use of an application, the method comprising:
    providing a session for a user of the application, wherein the session is provided based on a user credential;
    while providing the session, obtaining first image data for the session;
    responsive to obtaining the first image data for the session, performing a first authentication based on a determination whether the first image data for the session includes a facial image that matches the user credential;
    responsive to success of the first authentication based on the first image data for the session matching the user credential, continuing to provide the session for the user and access to a low security zone and a high security zone of the application;
    responsive to continuing to provide the session for the user, obtaining second image data for the session;
    responsive to obtaining the second image data for the session, performing a second authentication based on a determination whether the second image data for the session includes a facial image that matches the user credential; and
    responsive to failure of the second authentication based on the second image data for the session not matching the user credential, continuing to provide the session while selectively providing access to the low security zone of the application and blocking access to the high security zone of the application.

2. The method of claim 1, further comprising:
    responsive to obtaining the first image data for the session, logging the first facial image of the user in an audit log for the user.

3. The method of claim 1, wherein performing the first authentication comprises, responsive to uncertainty regarding the image data including the first facial image that matches the user credential, transmitting a notification to a system administrator;

wherein continuing to provide the session responsive to success of the first authentication comprises continuing to provide the session responsive to receiving a confirmation from the system administer that the first image data includes the facial image that matches the user credential.

4. The method of claim 3, wherein performing the first authentication comprises, generating a facial recognition score based on a comparison of the first image data for the session and a data set including facial image data of a plurality of users of the network application including the user, wherein transmitting the notification to the system administrator comprises transmitting the notification responsive to the facial recognition score indicating uncertainty.

5. The method of claim 1, wherein performing the first authentication comprises, responsive to uncertainty regarding the first image data including the facial image that matches the user credential, obtaining additional image data;

wherein continuing to provide the session comprises continuing to provide the session responsive to obtaining the additional image data including the facial image that matches the user credential.

6. The method of claim 5, wherein obtaining the additional image data comprises, providing an instruction for the user to look in a designated direction, and obtaining the additional image data after providing the instruction.

7. The method of claim 5, wherein obtaining the additional image data comprises, providing an instruction for the user to hold a photo-identification next to the user's head, and obtaining the additional image data after providing the instruction.

8. The method of claim 5, wherein performing the first authentication comprises, generating a facial recognition score based on a comparison of the first image data for the session and a data set including facial image data of a plurality of users of the network application including the user, wherein obtaining the additional image data comprises obtaining the additional image data responsive to the facial recognition score indicating uncertainty.

9. The method of claim 1, wherein the determination whether the second image data for the session includes a facial image that matches the user credential comprises a determination that multiple facial images are included in the second image data for the session.

10. The method of claim 1, the method further comprising:

responsive to continuing to provide the session while selectively blocking access to the high security zone of the application, obtaining third image data for the session;

responsive to obtaining the third image data for the session, performing a third authentication based on a determination whether the third image data for the session includes a facial image that matches the user credential; and responsive to failure of the third authentication based on the third image data for the session not matching the user credential, terminating the session for the user.

11. The method of claim 1, further comprising:

responsive to the failure of the first authentication, transmitting a notification of the failure to a system administrator and/or to the user associated with the user credential.

12. The method of claim 1, wherein performing the first authentication based on the determination whether the first image data includes a facial image that matches the user credential comprises initiating facial recognition to compare the first image data for the session with a data set including facial image data of a plurality of users of the application including the user.

13. The method of claim 12, further comprising:

responsive to the first image data for the session including a facial image that matches the user credential, updating the facial image data of the user in the data set using the first image data for the session.

14. The method of claim 1, further comprising:

before providing the session, obtaining authentication information, wherein the authentication information includes the user credential and pre-session image data; and performing authentication based on a determination whether the pre-session image data includes a facial image that matches the user credential;

wherein providing the session comprises providing the session responsive to authentication success based on the pre-session image data.

15. The method of claim 1, wherein the user credential comprises a username and/or user identification.

16. The method of claim 15, wherein the user credential further comprises a password.

17. The method of claim 1, wherein the application comprises a network application hosted on a network application server, wherein the user is a user of a network client device, wherein the session is provided for the user of the network client device over a network using the network application hosted by the network application server, and wherein obtaining the first image data comprises obtaining the first image data for the session from the network client device at the network application server.

18. The method of claim 1, wherein obtaining the second image data comprises obtaining the second image data based on a determination that the user continues to access the high security zone of the application during the session.

19. The method of claim 1, wherein continuing to provide the session while selectively providing access to the low security zone of the application and blocking access to the high security zone of the application comprises providing access to a low security zone of the application to allow an unauthorized user to access the application during the session on behalf of the user without triggering a lockout.

20. The method of claim 19, the method further comprising:

responsive to continuing to provide the session while selectively providing access to the low security zone of the application and blocking access to at least a high security zone of the application, obtaining third image data for the session;

responsive to obtaining the third image data for the session, performing a third authentication based on a determination whether the third image data for the session includes a facial image that matches the user credential; and responsive to failure of the third authentication based on the third image data for the session not matching the user credential, continuing to provide the session while continuing to provide access to the low security zone of the application and blocking access to the high security zone of the application.

21. A first network device comprising:
a network interface configured to communicate with a second network device through a network;
a processor coupled to the network interface; and
a memory coupled to the processor and storing computer readable program code that is executable by the processor to perform operations comprising:
    providing a session for a user of a second network device using a network application over a network, wherein the session is provided based on a user credential of the second network device,
    receiving first image data for the session from the second network device over the network while providing the session,
    performing a first authentication responsive to the first image data for the session based on a determination whether the first image data for the session includes a facial image that matches the user credential,
    continuing to provide the session for the user of the second network device using the network application and access to a low security zone and a high security zone of the network application responsive to the first authentication success based on the first image data for the session matching the user credential,
receiving second image data for the session while continuing to provide the session for the user;
performing a second authentication based on a determination whether the second image data for the session includes a facial image that matches the user credential responsive to obtaining the second image data for the session;
continuing to provide the session while selectively providing access to the low security zone of the application and blocking access the high security zone of the application responsive to failure of the second authentication based on the second image data for the session not matching the user credential.

22. A computer program product comprising,
a non-transitory computer readable storage medium comprising computer readable program code embodied in the medium that when executed by a processor of a first network device causes the processor to perform operations comprising:
providing a session for a user of an application, wherein the session is provided based on a user credential;
while providing the session, obtaining first image data for the session;
responsive to obtaining the first image data for the session, performing a first authentication based on a determination whether the first image data for the session includes a facial image that matches the user credential;
responsive to success of the first authentication based on the first image data for the session matching the user credential, continuing to provide the session for the user and access to a low security zone and a high security zone of the application;
responsive to continuing to provide the session for the user, obtaining second image data for the session;
responsive to obtaining the second image data for the session, performing a second authentication based on a determination whether the second image data for the session includes a facial image that matches the user credential; and
responsive to failure of the second authentication based on the second image data for the session not matching the user credential, continuing to provide the session while selectively providing access to the low security zone of the application and blocking access to the high security zone of the application.

* * * * *